United States Patent
Ding

(10) Patent No.: US 11,093,389 B2
(45) Date of Patent: Aug. 17, 2021

(54) METHOD, APPARATUS, AND COMPUTER PROGRAM PRODUCT FOR MANAGING STORAGE SYSTEM

(71) Applicant: EMC IP Holding Company LLC, Hopkinton, MA (US)

(72) Inventor: Richard Chenyu Ding, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 111 days.

(21) Appl. No.: 16/456,934

(22) Filed: Jun. 28, 2019

(65) Prior Publication Data
US 2020/0233799 A1 Jul. 23, 2020

(30) Foreign Application Priority Data
Jan. 23, 2019 (CN) .......................... 201910062550.9

(51) Int. Cl.
*G06F 12/06* (2006.01)
*G06F 3/06* (2006.01)
*G06F 12/0802* (2016.01)

(52) U.S. Cl.
CPC .......... *G06F 12/0646* (2013.01); *G06F 3/064* (2013.01); *G06F 3/0604* (2013.01); *G06F 3/0679* (2013.01); *G06F 12/0802* (2013.01); *G06F 2212/461* (2013.01); *G06F 2212/7201* (2013.01)

(58) Field of Classification Search
CPC ...... G06F 3/0604; G06F 3/064; G06F 3/0679; G06F 12/0646; G06F 12/0802; G06F 2212/461; G06F 2212/7201
See application file for complete search history.

(56) References Cited

U.S. PATENT DOCUMENTS

| 9,411,717 | B2 * | 8/2016 | Goss ................... G06F 11/1012 |
| 9,696,919 | B1 * | 7/2017 | Vankamamidi ......... G06F 3/065 |
| 2010/0205353 | A1 * | 8/2010 | Miyamoto .......... G06F 12/0246 711/103 |

(Continued)

OTHER PUBLICATIONS

Y. Tsuchiya and T. Watanabe, "DBLK: Deduplication for primary block storage," 2011 IEEE 27th Symposium on Mass Storage Systems and Technologies (MSST), Denver, CO, 2011, pp. 1-5, doi: 10.1109/MSST.2011.5937237. (Year: 2011).*

(Continued)

*Primary Examiner* — Khoa D Doan
(74) *Attorney, Agent, or Firm* — Amin, Turocy & Watson, LLP

(57) ABSTRACT

Storage system management is provided. Metadata in a first version at a first time point of the storage system is obtained, here the metadata in the first version describes reference relations between at least one data block in a chunk included in the storage system and at least one object stored in the storage system at the first time point. Metadata in a second version at a second time point of the storage system is obtained, the second time point being after the first time point. The chunk included in the storage system is managed based on a determined difference between the metadata in the first version and the metadata in the second version. By means of the technical solution of the present disclosure, chunks in the storage system may be managed more effectively, and the chunk reclaiming efficiency may be increased.

20 Claims, 9 Drawing Sheets

(56) References Cited

U.S. PATENT DOCUMENTS

2019/0220198 A1* 7/2019 Kashi Visvanathan ...................... G06F 16/184
2020/0081642 A1* 3/2020 Brown .................. G06F 3/0671

OTHER PUBLICATIONS

F. Klein, K. Beineke and M. Schöttner, "Memory management for billions of small objects in a distributed in-memory storage," 2014 IEEE International Conference on Cluster Computing (CLUSTER), 2014, pp. 113-122. (Year: 2014).*

* cited by examiner

METHOD, APPARATUS, AND COMPUTER PROGRAM PRODUCT FOR MANAGING STORAGE SYSTEM

RELATED APPLICATION

The present application claims the benefit of priority to Chinese Patent Application No. 201910062550.9, filed on Jan. 23, 2019, which application is hereby incorporated into the present application by reference herein in its entirety.

FIELD

Various implementations of the present disclosure relate to a storage system, and more specifically, to a method, apparatus and computer program product for managing multiple objects stored in a storage system and multiple chunks included in the storage system.

BACKGROUND

With the development of computer technology, various storage systems are already widely applied in all types of data. Object-based storage systems have been developed so far. In such a storage system, storage spaces from multiple storage devices are managed as chunks. At this point, user data may be distributed as objects in one or more chunks in the storage system.

Since the storage system might comprise a large number of chunks, and many users in the storage system might frequently add, modify or delete objects from the storage system, there might be a great number of chunks in the storage system which are no longer used by objects of any users. At this point, it becomes a hot research topic regarding how to manage multiple objects stored in the storage system and multiple chunks included in the storage system.

SUMMARY

Therefore, it is desirable to develop and implement a technical solution for managing a storage system more effectively. It is desired that the technical solution can be compatible with existing application environments and manage the storage system more effectively by reconstructing various configurations of existing application environments.

According to a first aspect of the present disclosure, there is provided a method for managing a storage system. In the method, metadata in a first version at a first time point of the storage system is obtained, here the metadata in the first version describing reference relations between at least one data block in a chunk included in the storage system and at least one object stored in the storage system at the first time point. Metadata in a second version at a second time point of the storage system is obtained, the second time point being after the first time point. Difference is determined between the metadata in the first version and the metadata in the second version. The chunk included in the storage system is managed based on the determined difference.

According to a second aspect of the present disclosure, there is provided an apparatus for managing a storage system, comprising: at least one processor; a volatile memory; and a memory coupled to the at least one processor, the memory having instructions stored thereon, the instructions, when executed by the at least one processor, causing the apparatus to perform acts. The acts include: obtaining metadata in a first version at a first time point of the storage system, the metadata in the first version describing reference relations between at least one data block in a chunk included in the storage system and at least one object stored in the storage system at the first time point; obtaining metadata in a second version at a second time point of the storage system, the second time point being after the first time point; determining difference between the metadata in the first version and the metadata in the second version; and managing the chunk included in the storage system based on the determined difference.

According to a third aspect of the present disclosure, there is provided a computer program product. The computer program product is tangibly stored on a non-transient computer readable medium and comprises machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

Figure 1:
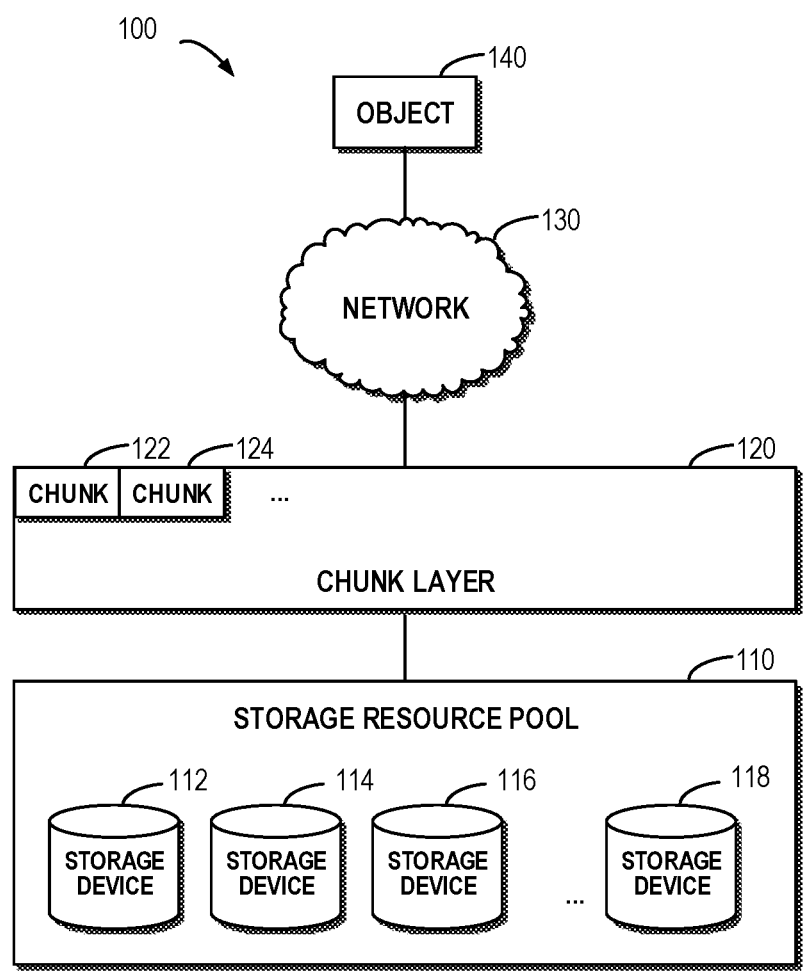
FIG. 1 schematically illustrates a block diagram of a storage system in which implementations of the present invention may be implemented.

FIG. 1 schematically shows a block diagram of a storage system 100 in which implementations of the present invention may be implemented. As depicted, there may be provided a storage resource pool 110, and the resource pool 110 may comprise multiple storage devices 112, 114, 116, . . . , and 118. Although multiple independent physical storage devices 112, 114, 116, . . . , and 118 are shown here, according to example implementations of the present disclosure, each storage device may further be a virtual storage device. A storage device 100 may further be provided based on the resource pool 110. Above the resource pool 110, a chunk layer 120 may further be provided. The chunk layer may comprise multiple chunks divided by predetermined size, such as a chunk 122, a chunk 124, etc. The size of each chunk may be set according to a concrete application environment of the storage system. For example, the chunk may be set as 128M or other value.

A user of the storage system 100 may access the chunks 122, 124 and so on at the chunk layer 120 via a network 130, and at this point data from the user may be stored at the chunk layer 120 in the form of an object 140. In view of the size of the object 140 or other policy, the object 140 may be stored to one or more chunks at the chunk layer 120. Specifically, suppose the size of the chunk is set as 128 MB and the size of the object 140 is 256 MB, then the object 140 may be stored in the chunks 122 and 124. At this point, it may be considered the chunk 122 is referenced by the object 140 and the chunk 124 is also referenced by the object 140.

It will be understood each chunk may further be divided into smaller storage units according to an address range. Here the storage unit may be called a data block. Suppose the object 140 has a size of 10M, then the object 140 may be stored in a 10M-sized data block in the chunk 122. At this point, it may be considered the data block is referenced by the object 140, and the rest part of the chunk 122 may further be divided into data blocks having other size, so as to store data from other objects.

Figure 2:
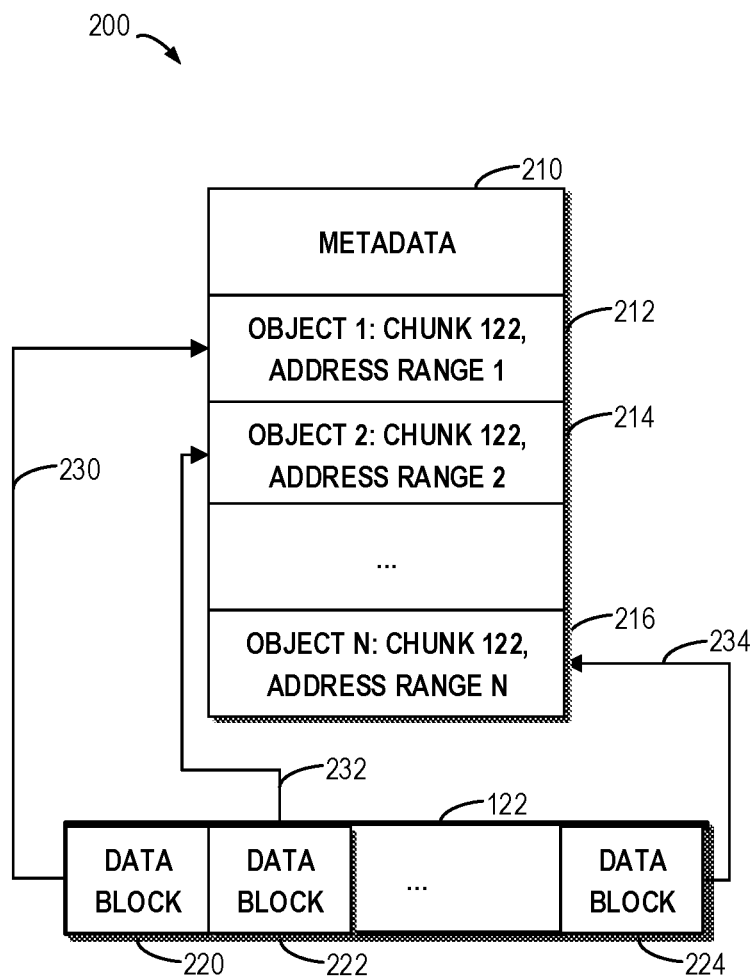
FIG. 2 schematically illustrates a block diagram of a chunk in a storage system which may be managed using implementations of the present invention.

FIG. 2 schematically shows a block diagram 200 of chunks in the storage system 100 which may be managed using implementations of the present invention. As depicted, the chunk 122 may comprise multiple data blocks, such as a data block 220, a data block 222, . . . , and a data block 224. As shown in FIG. 2, metadata 210 may represent reference relations (as shown by arrows 230, 232 and 234) between at least one data block (e.g. the data blocks 220, 222, . . . , and 224) in chunks included in the storage system 100 and at least one object (e.g. objects 1, 2, . . . , N) stored in the storage system 100. For example, an entry 212 in the metadata 210 represents: the object 1 is stored to an address range 1 in the chunk 122 (i.e., an address range where the data block 220 is located). An entry 214 in the metadata 210 represents: the object 2 is stored to an address range 2 in the chunk 122 (i.e., an address range where the data block 222 is located). An entry 216 in the metadata 210 represents: the object N is stored to an address range N in the chunk 122 (i.e., an address range where the data block 224 is located).

It will be understood the above reference relations between data blocks in a chunk and objects are merely for the illustration purpose. Although FIG. 2 illustrates one data block is reference by one object, the data block may be simultaneously referenced by multiple objects. For example, suppose the object 1 references the data block 220, and the object 1 is duplicated as the object 2, then at this point the object 2 also references the data block 220. Further, one object may comprise data in multiple data blocks in multiple chunks. In this case, there may exist multiple-to-multiple complex reference relations between data blocks and objects.

It will be understood as a large number of users continuously add, modify and deletes objects from the storage system 100, mapping relations between objects and chunks in the storage system 100 might change constantly. When a certain chunk contains no more data block that has a reference relation with any object (i.e., contains no more valid data block), data in the chunk are no longer valid data, so storage space of the chunk may be reclaimed to be allocated to other user or for other purpose.

Figure 3:
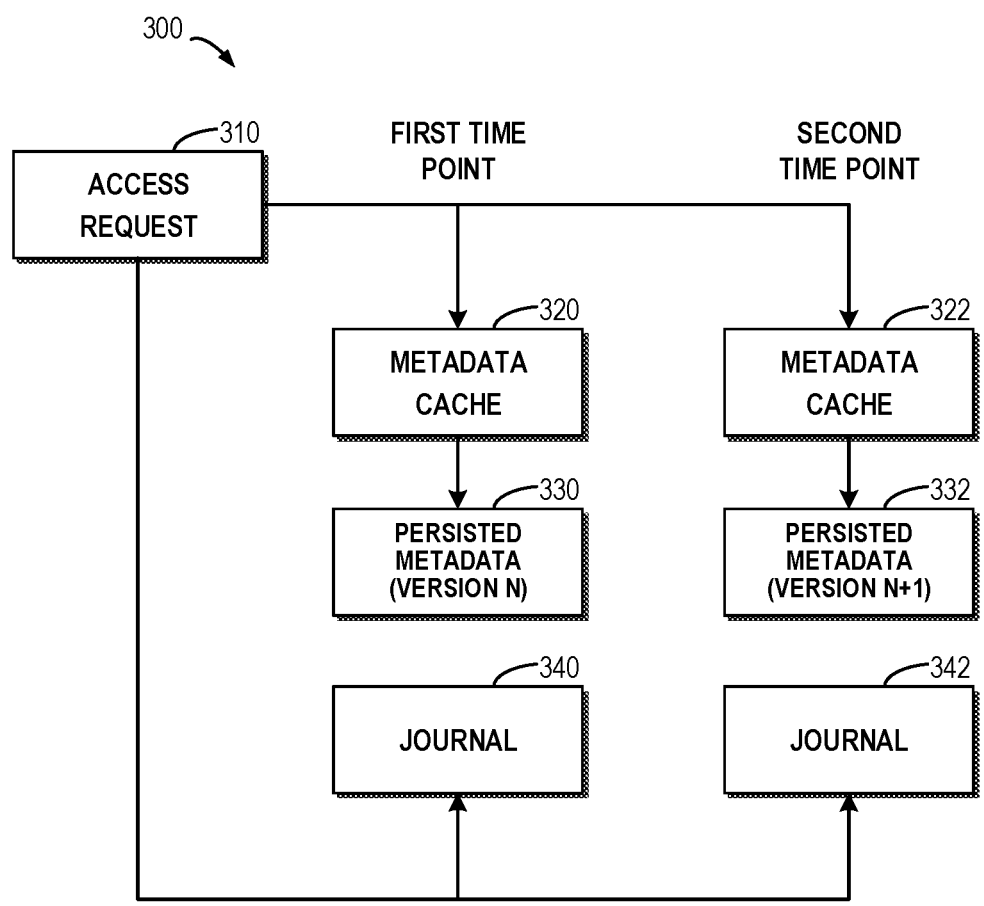
FIG. 3 schematically illustrates a block diagram of a metadata-related component in a storage system which may be managed using implementations of the present invention.

FIG. 3 schematically shows a block diagram 300 of metadata-related components in a storage system which may be managed using implementations of the present invention. FIG. 3 shows a metadata cache 320, persisted metadata (in version N) 330 and a journal 340 at a first time point. FIG. 3 further shows a metadata cache 322, persisted metadata (in version N+1) 332 and a journal 342 at a second time point. The journal 340 stores a copy of metadata in the metadata cache 320, and the journal 342 stores a copy of metadata in the metadata cache 322. Metadata in both the metadata caches 320 and 322 may be persisted in a persistent memory of the storage system so as to form the persisted metadata 330 and 332.

Technical solutions for managing chunks and objects in the storage system 100 have been proposed. According to one technical solution, it may be determined based on the journals 340 and 342 obtained at different time points which reference relation is changed, and further it may be determined whether each data block in a chunk is referenced by an object stored in the storage system 100. However, during the running of the storage system 100, data in the metadata cache might change with an access request 310. At this point, the journal 340 and data in the metadata cache 320 might be inconsistent with each other, and the journal 342 and data in the metadata cache 322 also might be inconsistent with each other. If changed metadata are determined directly based on a comparison of metadata in the journals 340 and 342, then a chunk still comprising a data block referenced by an object might be reclaimed mistakenly. Therefore, it needs to compare whether the journal is consistent with data in the metadata cache before reclaiming, and the reclaiming is performed only if consistency. However, such technical solutions involve complex operational processes, and it can be barely guaranteed chunks being no more referenced can be reclaimed with higher efficiency.

At this point, it is a hot research topic regarding how to manage objects and chunks in the storage system 100 with higher efficiency. In order to at least partly solve problems in existing technical solutions, according to example implementations of the present disclosure, there is proposed a technical solution for managing the storage system 100. According to example implementations of the present disclosure, difference between the persisted metadata (in version N) 330 and the persisted metadata (in version N+1) 332 may be directly compared, and further it may be determined based on the difference in which way the reclaiming is performed in the storage system 100. By means of the example implementations, it does not need to check consistency between the journal and the metadata cache, and further the storage system 100 may be managed with higher efficiency.

Figure 4:
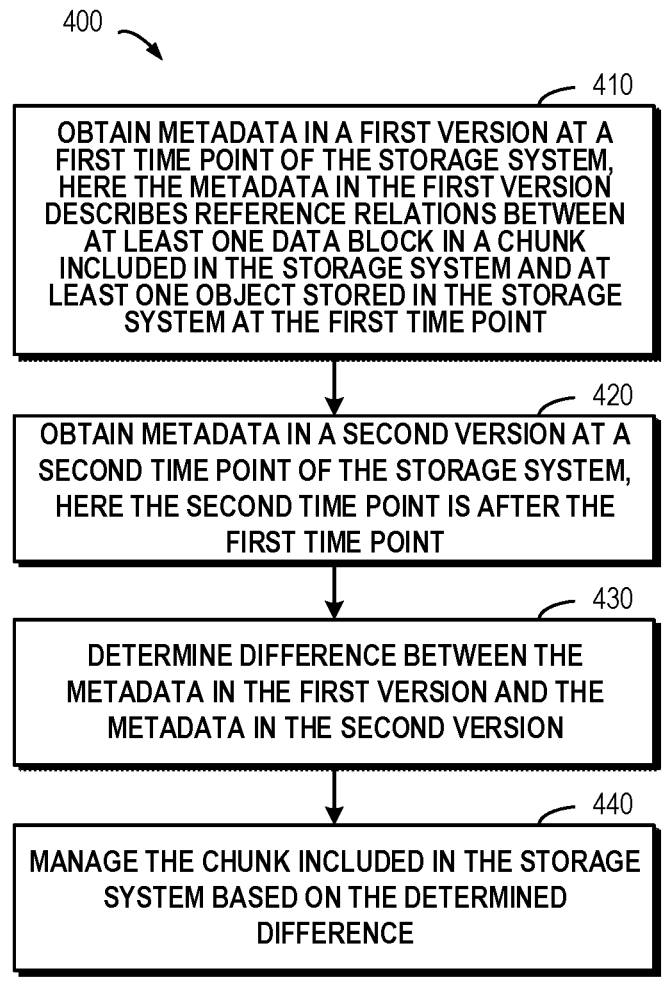
FIG. 4 schematically illustrates a flowchart of a method for managing a storage system according to implementations of the present disclosure.

With reference to FIG. 4, more details about the present disclosure will be described, wherein FIG. 4 schematically shows a flowchart of a method 400 for managing the storage system 100 according to implementations of the present disclosure. At block 410, metadata in a first version at a first time point of the storage system 100 is obtained, here the metadata in the first version describing reference relations between at least one data block in chunks included in the storage system 100 and at least one object stored in the storage system 100 at the first time point. Returning back to FIG. 3, here the metadata in the first version may be the persisted metadata 330 in version N, and metadata in a second version may be the persisted metadata 322 in version N+1.

According to an example implementation of the present disclosure, the metadata in the first version may be obtained from a persistent memory of the storage system 100. In this example implementation, the persistent memory may comprise metadata that are persisted to the persistent memory from a metadata cache of the storage system 100 at the first time point.

At block 420, metadata in a second version at a second time point of the storage system is obtained. Here the metadata in the second version describe reference relations between at least one data block in chunks included in the storage system 100 and at least one object stored in the storage system 100 at the second time point. The way in which the metadata in the second version is obtained is similar to that at block 410.

It will be understood the second time point here is after the first time point, and the first time point and the second time point may be two time points which are determined according to time intervals specified by the storage system and which are used to perform persistence operations to data in the metadata cache. According to an example implementation of the present disclosure, it is not intended to limit a time interval between two time points, but two consecutive or discontinuous time points may be selected.

It will be understood the time interval between the first time point and the second time point may be adjusted. In general, the smaller the time interval is, the smaller the possibility that metadata are changed. Since the change of metadata might trigger a subsequent reclaim operation, the time granularity for triggering reclaim operations may be controlled by adjusting the time interval between two time points. A smaller time interval makes it possible to check with higher efficiency whether there exist in the storage system a chunk which may be reclaimed, and further to release with higher efficiency a chunk that may be reclaimed. Further it should be understood checking whether a reclaim condition is met will also occupy processing resources in the storage system. Therefore, the time interval between the first time point and the second time point may be adjusted according to a usage state in the storage system.

At block 430, difference may be determined between the metadata in the first version and the metadata in the second version. Here, the difference between the metadata in these two versions may be determined in various ways. For example, entries in the metadata in these two versions may be compared one by one. If it is found a certain entry exists in the first version but not in the second version, then it may be considered there is difference between the metadata in these two versions. At this point, it may be considered the entry is deleted from the first version. In other words, a data block in the chunk as specified by the entry is no longer referenced by a relevant object. For example, this case might occur when an object is deleted from the storage system or content of an object is modified.

If it is found a certain entry exists in the second version but not in the first version, it may be considered there is difference between the metadata in these two versions. At this point, it may be considered a new entry is added to the metadata in the second version. In other words, in the chunk there is a new data block referenced by an object. This case might occur when a new object is stored to the storage system or an original object is modified.

It will be understood the foregoing two examples of possible difference are merely for the illustration purpose. In a concrete application environment, as numbers of users constantly add, modify or delete objects from the storage system, the difference between the two versions might become more complex. For example, regarding a chunk, it is possible that only one portion of the metadata in the two versions is identical or there is no identical portion between the metadata in the two versions.

According to example implementations of the present disclosure, the efficiency of determining the difference between the two versions may be increased by recording an access request that causes the metadata to change. In other words, if it is determined an access request for at least one object changes the reference relation, then the access request may be recorded. It will be understood since only the access request changing the reference relation will change the metadata, entries in the metadata in the two versions do not need to be compared one by one, but the difference between the metadata in the two versions may be found directly based on the recorded access request. In this way, the difference may be determined more effectively. In particular, when the metadata comprise a great number of entries, chunks, objects and data blocks involved in the difference between the metadata may be determined directly via the access request.

According to example implementations of the present disclosure, an object accessed by the recorded access request may be determined, and the difference between the metadata in the two versions may be determined based on the accessed object. According to example implementations of the present disclosure, the access request may comprise at least one of: a request for adding an object to the storage system 100; a request for deleting an object from the storage system 100; and a request for modifying an object in the storage system 100. It will be understood the access request will define an access type (e.g., read, add, modify, delete) and an object to be accessed. At this point, it may be determined based on the access type whether the access request will lead to change of the metadata. For example, since a read request will not lead to change of the metadata, while add, delete and modify operations might lead to change of the metadata, only access requests of add, delete and modify types may be recorded.

Figure 5:
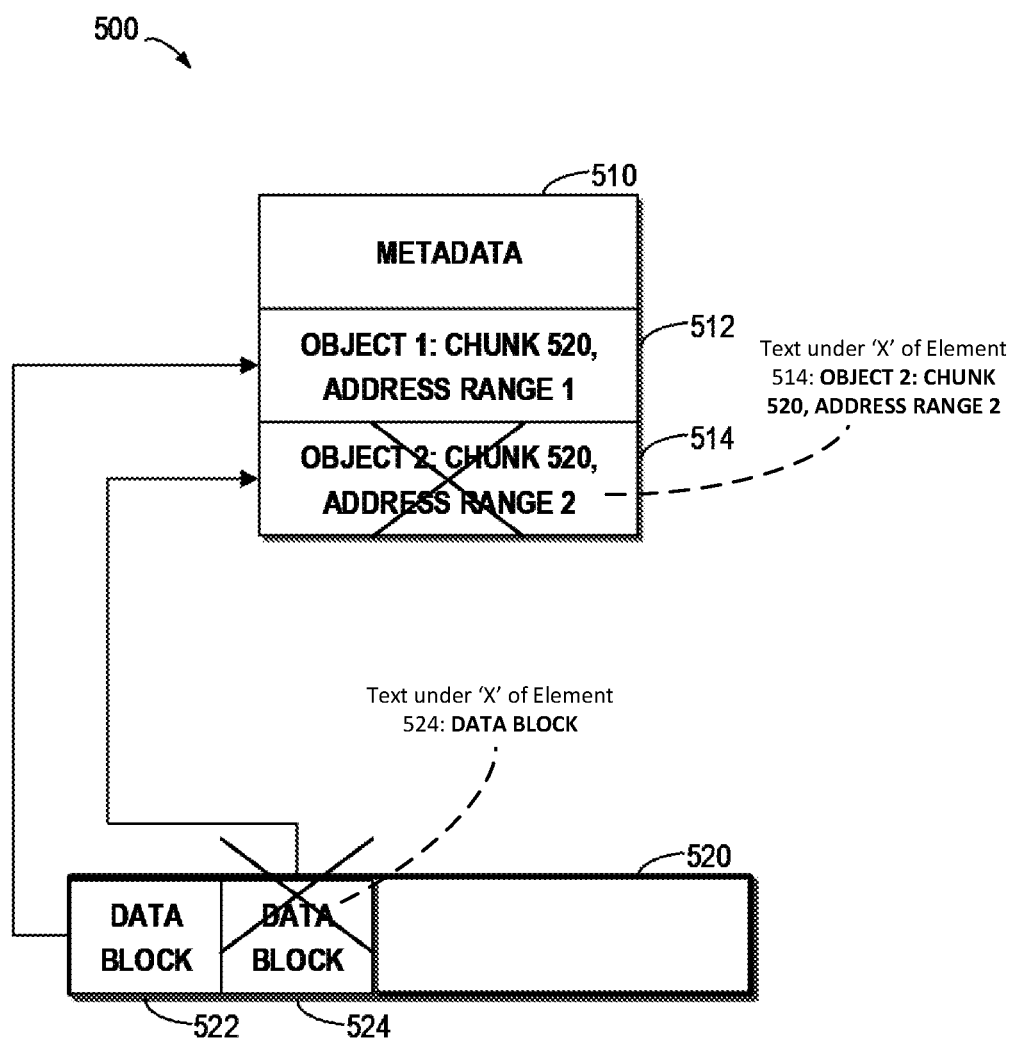
FIG. 5 schematically illustrates a block diagram of difference between metadata in different versions as caused by a delete request according to implementations of the present disclosure.

With reference to FIG. 5, more details about a delete request will be described in detail. FIG. 5 schematically shows a block diagram 500 of difference between metadata in difference versions as caused by a delete request according to implementations of the present disclosure. A chunk 520 in the storage system is illustrated, which may comprise two data blocks (i.e., a data block 522 and a data block 524) at a first time point. In the metadata in the first version, there exist an entry 512 and an entry 514 corresponding to the data block 522 and the data block 524, respectively. The entry 512 in the metadata 510 records a reference relation between the data block 522 and an object 1: the data block 522 is located within an address range 1 in the chunk 520. The entry 514 records a reference relation between the data block 524 and an object 2: the data block 524 is located within an address range 2 in the chunk 520.

Between the first time point and the second time point, suppose the storage system 100 receives a delete request for deleting the object 2 from the storage system 100. Since a delete request will lead to change of the metadata, the delete request may be recorded, and the data block associated with the object 2 in the chunk 520 may be marked as invalid based on the delete request. Further, difference between the metadata in the first version and the second version may be determined based on the delete request: the metadata in the second version does not comprise the entry 514 (denoted by a symbol x in FIG. 5) associated with the object 2.

According to example implementations of the present disclosure, a reference counter may be configured to indicate a count that each data block in the chunk is referenced. The reference counter may use the way shown in Table 1 below. Here, the reference counter describes a count that a data block is referenced by an object. The count may be represented as a non-negative integer, e.g. 0 time or multiple times.

TABLE 1

Examples of Reference Counter (at First Time Point)

| Data Block | Data Block 522 | Data Block 524 | . . . |
| Address Range | Address Range 1 | Address Range 2 | . . . |
| Reference Counter | 1 | 1 | . . . |

As shown in Table 1 above, the first row represents the identifier of a data block, the second row represents the address range of a data block, and the third row represents a count that a data block is referenced. According to example implementations of the present disclosure, various data blocks may have the same or difference sizes. According to example implementations of the present disclosure, the first row may be removed but each data block is differentiated by the address range. Alternatively and/or additionally, the reference counter may be stored in the form of a vector. It will be understood although illustrated above is a circumstance in which one data block is referenced by only one object (at this point the value of the reference counter is 1), according to example implementations of the present disclosure, one data block may further be referenced by multiple objects (at this point the value of the reference counter is an integer larger than 1).

Figure 6:
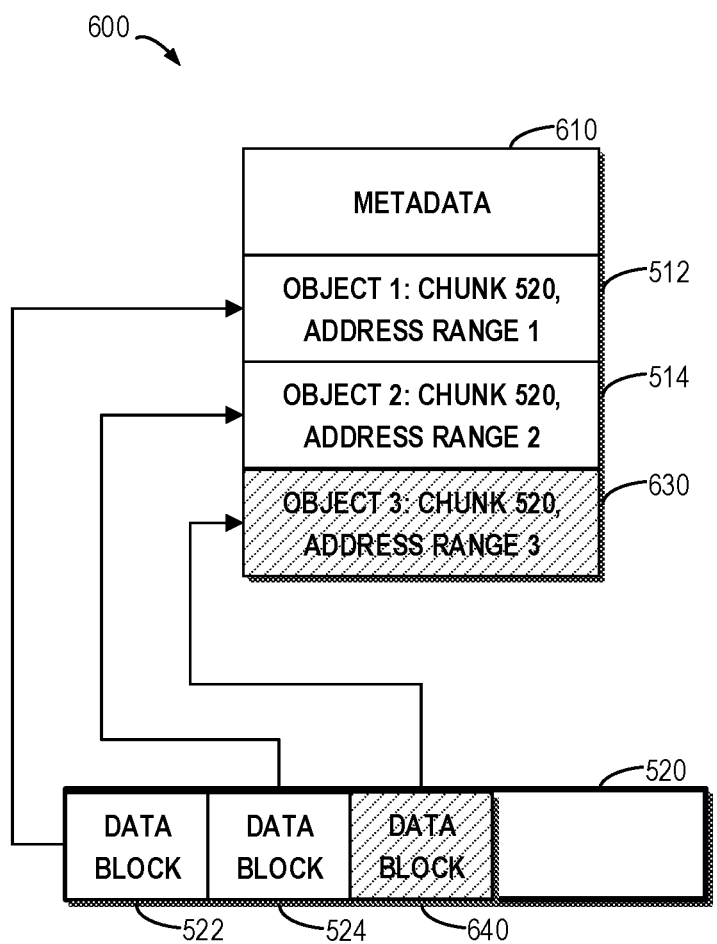
FIG. 6 schematically illustrates a block diagram of difference between metadata in different versions as caused by an add request according to implementations of the present disclosure.

With reference to FIG. 6, more details about an add request will be described in detail. FIG. 6 schematically shows a block diagram 600 of difference between metadata in difference versions as caused by an add request according to implementations of the present disclosure. A chunk 520 in the storage system 100 is illustrated, which may comprise two data blocks 522 and 524 at a first time point. In the metadata in the first version, there exist two entries 512 and 514. The entry 512 records a reference relation between the data block 522 and an object 1: the data block 522 is located within an address range 1 in the chunk 520. The entry 514 records a reference relation between the data block 524 and an object 2: the data block 524 is located within an address range 2 in the chunk 520.

Between the first time point and the second time point, suppose the storage system 100 receives an add request for adding an object 3 to the storage system 100. Since an add request will lead to change of the metadata, the add request may be recorded, and a data block 640 associated with the object 3 may be added to the chunk 520 based on the add request. Further, difference between the metadata in the first version and the second version may be determined based on the add request: the metadata in the second version further comprises an entry 630 (denoted by a shaded pattern in FIG. 6) associated with the object 3.

Figure 7:
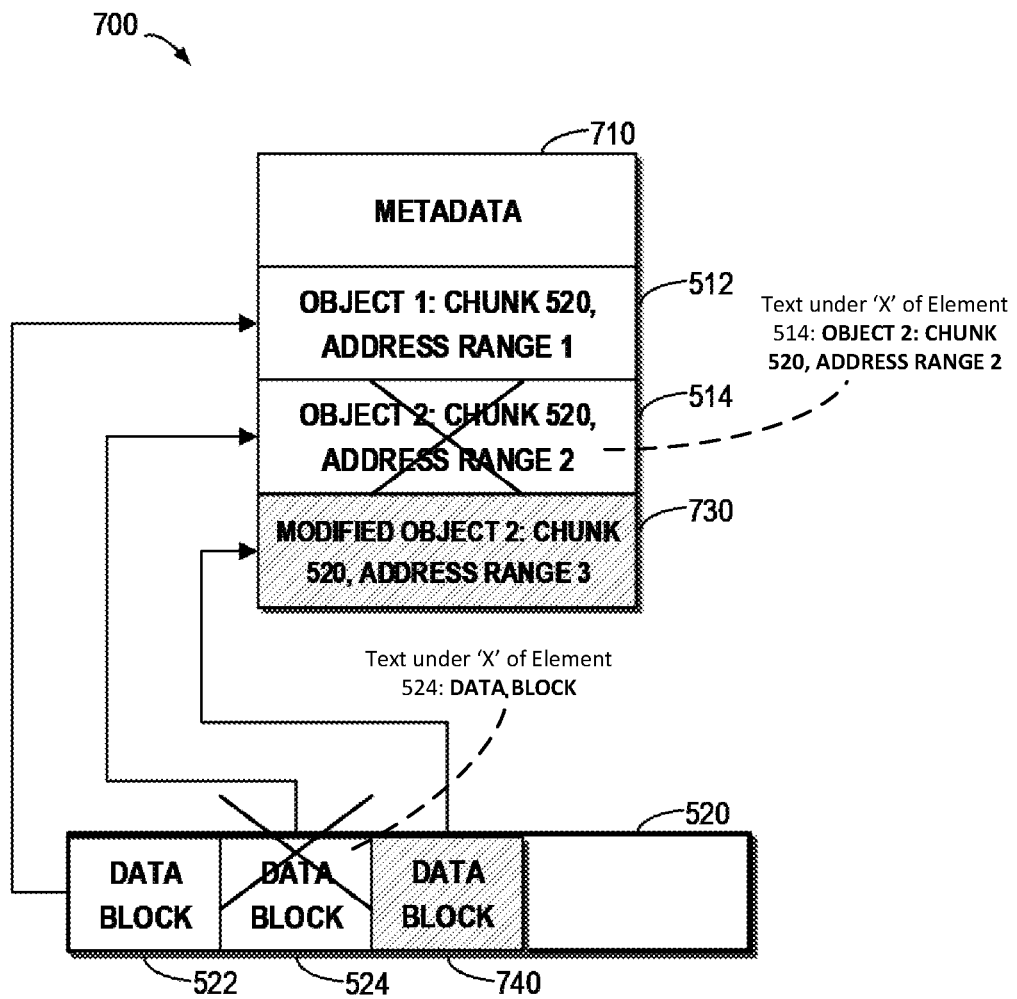
FIG. 7 schematically illustrates a block diagram of difference between metadata in different versions as caused by a modify request according to implementations of the present disclosure.

With reference to FIG. 7, more details about a modify request will be described in detail. FIG. 7 schematically shows a block diagram 700 of difference between metadata in difference versions as caused by a modify request according to implementations of the present disclosure. A chunk 520 in the storage system is illustrated, which may comprise two data blocks 522 and 524 at a first time point. In the metadata in the first version, there exist two entries 512 and 514. The entry 512 records a reference relation between the data block 522 and an object 1: the data block 522 is located within an address range 1 in the chunk 520. The entry 514 records a reference relation between the data block 524 and an object 2: the data block 524 is located within an address range 2 in the chunk 520.

Between the first time point and the second time point, suppose the storage system 100 receives a modify request for modifying the object 2 in the storage system 100. Since a modify request will lead to change of the metadata, the modify request may be recorded, and the object 2 may be modified based on the modify request. The modify procedure comprises the steps of: 1) reading data of the data block 524 referenced by the object 2; 2) modifying read data and writing the read data to a data block 740, and adding an entry 730 to metadata 710; 3) marking the data block 524 as invalid, and deleting the entry 514 from the metadata 710. At this point, difference between the metadata in the first version and the second version may be determined based on the add request: the metadata in the second version further comprise an entry 740 (denoted by a shaded pattern in FIG. 7) associated with the modified object 2, and the metadata in the second version does not comprise the entry 514 (denoted by a symbol x in FIG. 7) associated with the object 2 before being modified.

Through the examples shown in FIGS. 5 to 7, difference between the metadata in the two versions may be determined with higher efficiency by recording an access request that leads to change of the metadata. Detailed description is presented below to how to manage chunks in the storage system based on the determined difference. Returning to FIG. 4, at block 440, the chunk included in the storage system 100 may be managed based on the determined difference. For example, a data block associated with the difference may be determined in the chunk, and a reference counter of the data block may be updated, and subsequently the chunk may be managed based on the updated reference counter.

The management here may cover various aspects. For example, a reference counter of the chunk may be updated based on the difference. According to example implementations of the present disclosure, if the difference indicates the data block is no longer referenced by an object of the at least one object, then a value of the reference counter may be reduced. For example, after performing the data delete operation as shown in FIG. 5, the reference counter of the chunk 520 may be as shown in Table 2 below.

TABLE 2

Example of Reference Counter After Performing Delete Operation

| Data Block | Data Block 522 | Data Block 524 | ... |
|---|---|---|---|
| Address Range | Address Range 1 | Address Range 2 | ... |
| Reference Counter | 1 | 0 | ... |

It will be understood since the object is deleted at the second time point, the data block 524 referenced by the object 2 is no longer referenced by any object, at which point the data block 524 is marked as invalid. Therefore, the part in the reference counter corresponding to the data block 524 will be marked as 0. It will be understood Table 2 merely illustrates the circumstance in which the data block 524 is referenced by only one object, at which point a value of the reference counter reduces from 1 to 0. In another example, when the data block 524 is referenced by two objects, the value of the reference counter reduces from 2 to 1.

According to example implementations of the present disclosure, if the difference indicates the data block is referenced by other object in the storage system, the value of the reference counter may be increased. For example, after performing the data add operation as shown in FIG. 6, the reference counter of the chunk 520 may be as shown in Table 3 below.

TABLE 3

Example of Reference Counter After Performing Add Operation

| Data Block | Data Block 522 | Data Block 524 | Data Block 630 | ... |
|---|---|---|---|---|
| Address Range | Address Range 1 | Address Range 2 | Address Range 3 | ... |
| Reference Counter | 1 | 1 | 1 | ... |

For another example, after performing the data modify operation as shown in FIG. 7, the reference counter of the chunk 520 may be as shown in Table 4 below.

TABLE 4

Example of Reference Counter After Performing Modify Operation

| Data Block | Data Block 522 | Data Block 524 | Data Block 740 | ... |
|---|---|---|---|---|
| Address Range | Address Range 1 | Address Range 2 | Address Range 3 | ... |
| Reference Counter | 1 | 0 | 1 | ... |

According to example implementations of the present disclosure, first an allocation state of storage space in the chunk may be determined. If only part of storage space in the chunk is allocated and part of storage space is not yet allocated, then at this point the chunk still contains allocable storage space, so the chunk should not be reclaimed. If all storage space in the chunk is allocated, then whether the chunk can be reclaimed may be determined based on a reference counter of each data block in the chunk.

Figure 8A:
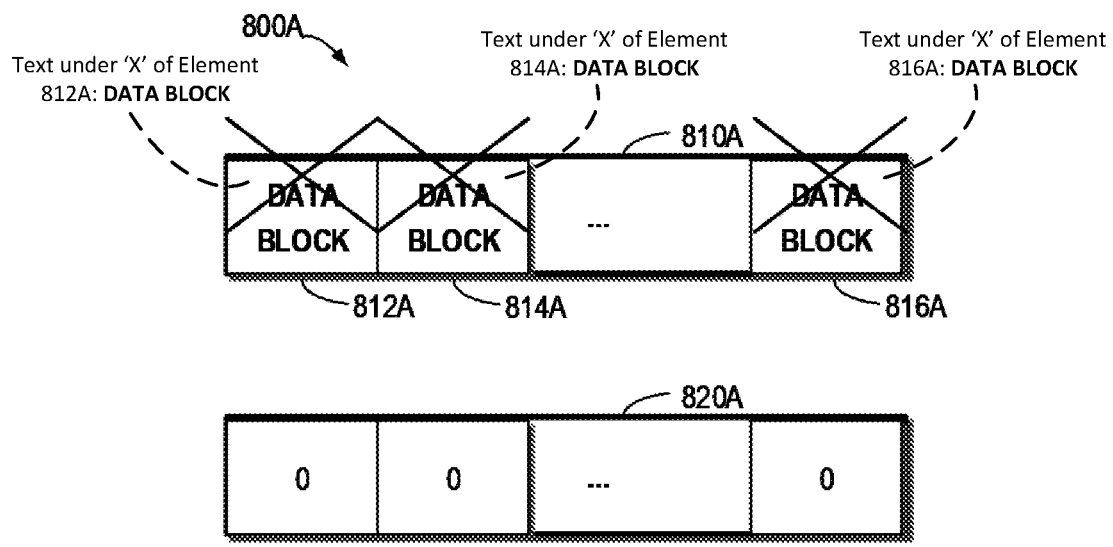
FIGS. 8A and 8B each schematically illustrate a block diagram for reclaiming a chunk in a storage system according to implementations of the present disclosure.

According to example implementations of the present disclosure, if it is determined reference counters of all data blocks in the chunk indicate: none data block is any longer referenced by any object in the storage system, the storage system 100 is notified to reclaim the chunk. FIG. 8A schematically shows a block diagram 800A for reclaiming a chunk in the storage system 100 according to implementations of the present disclosure. As depicted, a chunk 810A comprises multiple data blocks 812A, 814A, ..., and 816A at a first time point. Between the first time point and a second time point, the storage system 100 performs a delete operation and/or modify operation, which causes these data blocks to be marked as invalid. At this moment, values of all fields in a reference counter 820A associated with the chunk 810A are set to 0, which means these data blocks are no longer referenced by any object in the storage system. Then, the storage system may be notified to reclaim the chunk 810A.

By means of the foregoing example implementations, it may be determined whether the chunk meets a reclaim condition by judging whether the value of each field in the reference counter is 0. Compared with the traditional technical solution that needs to verify data consistency between journals and metadata caches, the reclaim operation may be performed with higher efficiency.

According to example implementations of the present disclosure, if only one or several data blocks in a chunk(s) are referenced and the rest data blocks are marked as invalid, at this point data in the chunk/chunks may be copied to other chunk (e.g., a chunk where most data blocks are referenced) in the storage system 100. In this way, the chunk reclaim efficiency may be increased, and further the reclaimed chunk may be allocated for other use so as to alleviate the storage resource shortage in the storage system 100.

Figure 8B:
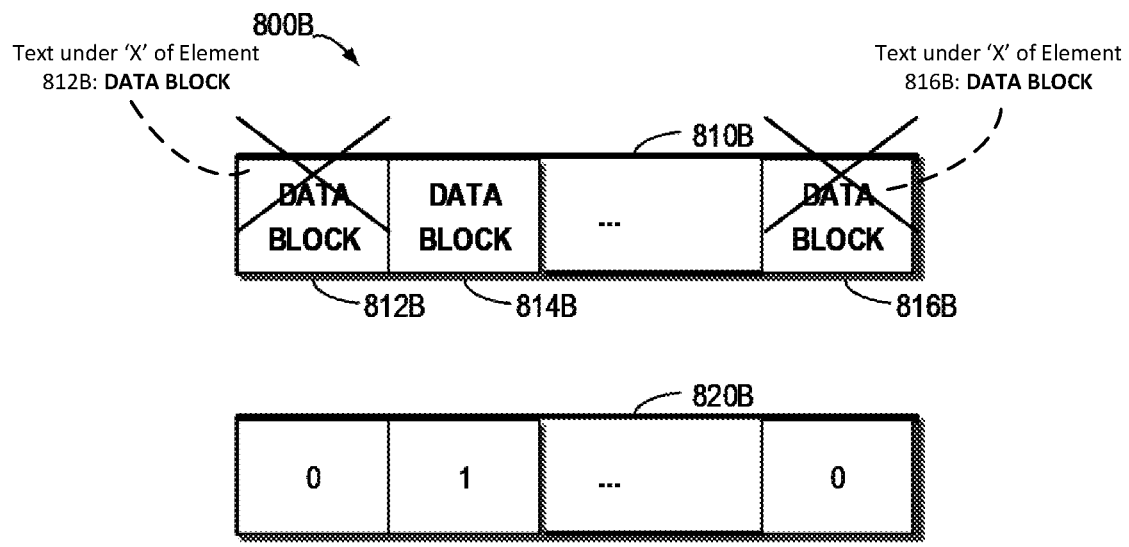

FIG. 8B schematically shows a block diagram 800B for reclaiming a chunk in the storage system according to implementations of the present disclosure. As depicted, a chunk 810B comprises multiple data blocks 812B, 814B, ..., and 816B at a first time point. The storage system performs a delete operation and/or modify operation between the first time point and a second time point, and as a result, most data blocks are marked as invalid and only the data block 814B is still referenced. At this moment, only the value of one field in a reference counter 820B associated with the chunk 810B is set to 1, while others are set to 0. Data in the data block 814B may be copied to other data block in the storage system 100. At this point, the data block 814B is no longer valid, and the storage system may be notified to reclaim the chunk 810B.

While examples of the method according to the present disclosure have been described in detail with reference to FIGS. 2 to 8, description is presented below to implementations of a corresponding apparatus. By means of the foregoing example implementations, relations between chunks and objects may be determined more quickly, and further the circumstance may be avoided in which some segment or segments in an object is or are stored in one or more chunks indicated by a to-be-reclaimed list and reclaimed mistakenly. Further, the reliability of the storage system may be improved, and it may be ensured a chunk which is no longer used in the storage system 100 may be reclaimed in time.

According to example implementations of the present disclosure, there is provided an apparatus for managing a storage system. The apparatus comprises: a first obtaining module configured to obtain metadata in a first version at a first time point of the storage system, the metadata in the first version describing reference relations between at least one data block in a chunk included in the storage system and at least one object stored in the storage system at the first time point; a second obtaining module configured to obtain metadata in a second version at a second time point of the storage system, the second time point being after the first time point; a determining module configured to determine difference between the metadata in the first version and the metadata in the second version; and a managing module configured to manage the chunk included in the storage system based on the determined difference.

According to example implementations of the present disclosure, the first obtaining module is configured to obtain the metadata in the first version from a persistent memory of the storage system, and the persistent memory comprises metadata persisted from a metadata cache of the storage system to the persistent memory at the first time point.

According to example implementations of the present disclosure, the managing module comprises: a data block determining module configured to determine a data block associated with the difference in the chunk; an updating module configured to update a reference counter of the data block, the reference counter describing a count that the data block is referenced by the at least one object; and a chunk managing module configured to manage the chunk based on the updated reference counter.

According to example implementations of the present disclosure, the updating module is configured to: increase the reference counter in response to the difference indicating the data block is referenced by another object in the storage system; and reduce the reference counter in response to indicating the data block is no longer referenced by an object of the at least one object.

According to example implementations of the present disclosure, the chunk managing module comprises: a state determining module configured to determine an allocation state of storage space in the chunk; and a reclaiming module configured to reclaim the chunk according to a reference counter of a data block in the chunk in response to determining all storage space in the chunk has been allocated.

According to example implementations of the present disclosure, the reclaiming module is configured to: notify the storage system to reclaim the chunk in response to reference counters of all data blocks in the chunk indicating all these data blocks are no longer referenced by any object in the storage system.

According to example implementations of the present disclosure, the reclaiming module is configured to: copy data in a given data block to other chunk in the storage system in response to determining a reference counter of the given data block in the chunk indicates the given data block is referenced by an object in the storage system.

According to example implementations of the present disclosure, the determining module further comprises: a recording module configured to record an access request for the at least one object in response to determining the access request changes the reference relation.

According to example implementations of the present disclosure, the determining module further comprises: an object determining module configured to determine an object accessed by a recorded access request; and a difference determining module configured to determine the difference based on the accessed object.

According to example implementations of the present disclosure, the access request comprises at least one of: a request for adding an object to the storage system; a request for deleting an object from the storage system; and a request for modifying an object in the storage system.

Figure 9:
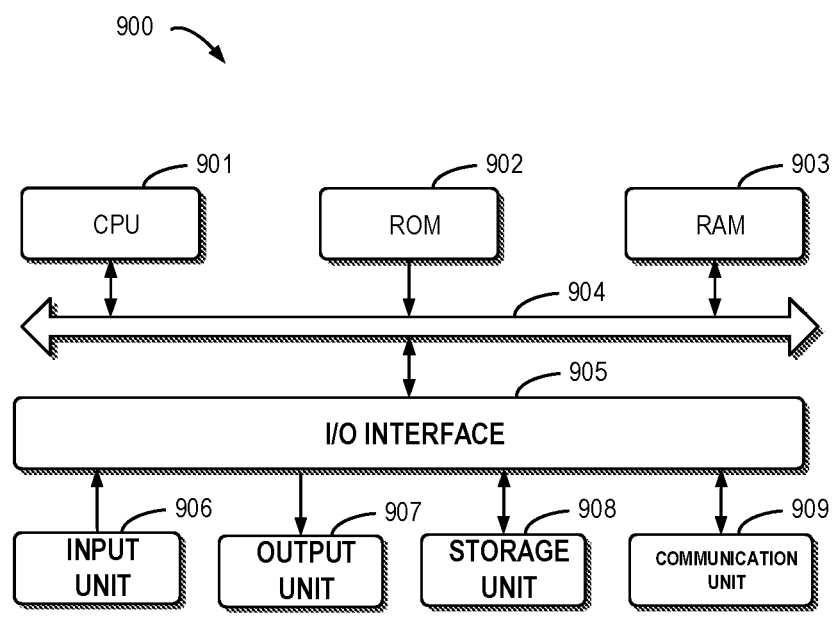
FIG. 9 schematically illustrates a block diagram of an apparatus for managing a storage system according to example implementations of the present disclosure.

FIG. 9 schematically shows a block diagram of an apparatus 900 for managing a storage system according to example implementations of the present disclosure. As depicted, the apparatus 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the apparatus 900. CPU 901, ROM 902 and RAM 903 are connected to each other via a bus 904. The input/output (I/O) interface 905 is also connected to the bus 904.

A plurality of components in the apparatus 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the apparatus 900 to exchange information/data with other devices via the computer network, such as Internet, and/or various telecommunication networks.

The above described each process and treatment, such as the method 400, can also be executed by the processing unit 901. For example, in some implementations, the method 400 can be implemented as a computer software program tangibly included in the machine-readable medium, e.g., the storage unit 908. In some implementations, the computer program can be partially or fully loaded and/or mounted to the apparatus 900 via ROM 902 and/or the communication unit 909. When the computer program is loaded to the RAM 903 and executed by the CPU 901, one or more steps of the above described method 400 can be implemented. Alternatively, in other implementations, the CPU 901 also can be configured in other suitable manners to realize the above procedure/method.

According to example implementations of the present disclosure, there is provided an apparatus for managing a storage system, comprising: at least one processor; a volatile memory; and a memory coupled to the at least one processor, the memory having instructions stored thereon, the instructions, when executed by the at least one processor, causing the apparatus to perform acts. The acts include: obtaining metadata in a first version at a first time point of the storage system, here the metadata in the first version describes reference relations between at least one data block in a chunk included in the storage system and at least one object stored in the storage system at the first time point; obtaining metadata in a second version at a second time point of the storage system, the second time point being after the first time point; determining difference between the metadata in the first version and the metadata in the second version; and managing the chunk included in the storage system based on the determined difference.

According to example implementations of the present disclosure, the metadata in the first version is obtained from a persistent memory of the storage system, and the persistent memory comprises metadata persisted from a metadata cache of the storage system to the persistent memory at the first time point.

According to example implementations of the present disclosure, a data block associated with the difference in the chunk is determined; a reference counter of the data block is updated, the reference counter describing a count that the data block is referenced by the at least one object; and the chunk is managed based on the updated reference counter.

According to example implementations of the present disclosure, the reference counter is increased in response to the difference indicating the data block is referenced by another object in the storage system; and the reference counter is reduced in response to indicating the data block is no longer referenced by an object of the at least one object.

According to example implementations of the present disclosure, an allocation state of storage space in the chunk is determined; and the chunk is reclaimed according to a reference counter of a data block in the chunk in response to determining all storage space in the chunk has been allocated.

According to example implementations of the present disclosure, the storage system is notified to reclaim the chunk in response to reference counters of all data blocks in the chunk indicating all these data blocks are no longer referenced by any object in the storage system.

According to example implementations of the present disclosure, data in a given data block are copied to another chunk in the storage system in response to determining a reference counter of the given data block in the chunk indicates the given data block is referenced by an object in the storage system.

According to example implementations of the present disclosure, an access request for the at least one object is recorded in response to determining the access request changes the reference relation.

According to example implementations of the present disclosure, an object accessed by a recorded access request is determined; and the difference is determined based on the accessed object.

According to example implementations of the present disclosure, the access request comprises at least one of: a request for adding an object to the storage system; a request for deleting an object from the storage system; and a request for modifying an object in the storage system.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

I claim:

1. A method, comprising:
    obtaining, by a system comprising a processor, first metadata in a first version at a first time point of a storage system, the first metadata in the first version describing reference relations between at least one data block in a chunk included in the storage system and at least one object stored in the storage system at the first time point;
    obtaining second metadata in a second version at a second time point of the storage system, the second time point being after the first time point;
    determining a difference between the first metadata in the first version and the second metadata in the second version;
    managing the chunk included in the storage system based on the difference, wherein the managing the chunk based on the difference comprises:
        determining a data block of the at least one data block in the chunk associated with the difference,
        updating a reference counter of the data block, the reference counter describing a count of objects, of the at least one object, that reference the data block, the updating resulting in an updated reference counter, and
        managing the chunk based on the updated reference counter, wherein the managing the chunk based on the updated reference counter comprises:
            determining an allocation state of storage space in the chunk, and
            in response to determining, based on the allocation state, that the storage space in the chunk has been allocated, reclaiming the chunk according to respective reference counters describing respective counts of objects of the at least one data block in the chunk.

2. The method of claim 1, wherein the obtaining the first metadata in the first version at the first time point of the storage system comprises:
    obtaining the first metadata in the first version from a persistent memory of the storage system, the persistent memory comprising metadata persisted from a metadata cache of the storage system to the persistent memory at the first time point.

3. The method of claim 1, wherein the updating the reference counter of the data block comprises:
    increasing the reference counter in response to the difference indicating the data block is referenced by another object in the storage system; and
    reducing the reference counter in response to indicating the data block is no longer referenced by an object of the at least one object.

4. The method of claim 1, wherein the reclaiming the chunk according to the respective reference counters comprises:
    notifying the storage system to reclaim the chunk in response to the respective reference counters indicating that all of the at least one data block are no longer referenced by any object of the at least one object in the storage system, or
    wherein the reclaiming the chunk according to the respective reference counters comprises:
    copying data in a given data block of the at least one data block to another chunk in the storage system in response to determining a corresponding reference counter of the given data block in the chunk indicates the given data block is referenced by an object of the at least one object in the storage system.

5. The method of claim 1, further comprising:
    recording an access request for the at least one object in response to determining the access request changes a reference relation of the reference relations.

6. The method of claim 5, wherein the determining the difference between the first metadata in the first version and the second metadata in the second version comprises:
 determining an accessed object accessed by a recorded access request; and
 determining the difference based on the accessed object.

7. The method of claim 5, wherein the access request comprises at least one of:
 a request to add a first object to the storage system;
 a request to delete a second object from the storage system; and
 a request to modify a third object in the storage system.

8. The method of claim 1, wherein the at least one object is a set of objects, wherein the respective reference counters of the at least one data block comprise the updated reference counter of the data block, and wherein the respective reference counters describe respective counts of objects, of respective sets of objects, that respectively reference respective data blocks of the at least one data block.

9. An apparatus, comprising:
 at least one processor; and
 a memory coupled to the at least one processor and having instructions stored thereon, the instructions, when executed by the at least one processor, causing the apparatus to perform acts comprising:
  obtaining first metadata in a first version at a first time point of a storage system, the first metadata in the first version describing reference relations between at least one data block in a chunk included in the storage system and at least one object stored in the storage system at the first time point;
  obtaining second metadata in a second version at a second time point of the storage system, the second time point being after the first time point;
  determining a difference between the first metadata in the first version and the second metadata in the second version; and
  managing the chunk included in the storage system based on the difference, wherein the managing the chunk based on the difference comprises:
   determining a data block of the at least one data block in the chunk associated with the difference;
   updating a reference counter of the data block, the reference counter describing a count of objects, of the at least one object, that reference the data block, the updating resulting in an updated reference counter, and
   managing the chunk based on the updated reference counter, wherein the managing the chunk based on the updated reference counter comprises:
    determining an allocation state of storage space in the chunk, and
    in response to determining, based on the allocation state, that the storage space in the chunk has been allocated, reclaiming the chunk according to respective reference counters of the at least one data block in the chunk, wherein the respective reference counters of the at least one data block comprise the updated reference counter of the data block.

10. The apparatus of claim 9, wherein the obtaining the first metadata in the first version at the first time point of the storage system comprises:
 obtaining the first metadata in the first version from a persistent memory of the storage system, the persistent memory comprising metadata persisted from a metadata cache of the storage system to the persistent memory at the first time point.

11. The apparatus of claim 9, wherein the updating the reference counter of the data block comprises:
 increasing the reference counter in response to the difference indicating the data block is referenced by another object in the storage system; and
 reducing the reference counter in response to indicating the data block is no longer referenced by an object of the at least one object.

12. The apparatus of claim 9, wherein the reclaiming the chunk according to a reference counter of a data block in the chunk comprises:
 notifying the storage system to reclaim the chunk in response to the respective reference counters indicate that respective ones of the at least one data block are no longer referenced by any object in the storage system.

13. The apparatus of claim 9, wherein the reclaiming the chunk according to the respective reference counters of the at least one data block comprises:
 copying data in a given data block to a different chunk, other than the chunk, in the storage system in response to determining that a corresponding reference counter, corresponding to the given data block, indicates that the given data block is referenced by an object of the at least one object in the storage system.

14. The apparatus of claim 9, wherein the acts further comprise:
 recording an access request for the at least one object in response to determining the access request changes a reference relation of the reference relation.

15. The apparatus of claim 14, wherein the determining the difference between the first metadata in the first version and the second metadata in the second version comprises:
 determining an accessed object accessed by a recorded access request; and
 determining the difference based on the accessed object.

16. The apparatus of claim 14, wherein the access request comprises at least one of:
 a request for an addition of a first object to the storage system;
 a request for a deletion of a second object from the storage system; and
 a request for a modification of a third object in the storage system.

17. A computer program product, stored on a non-transitory computer readable medium and comprising machine executable instructions which are used to execute operations, comprising:
 obtaining first metadata in a first version at a first time point of a storage system, the first metadata in the first version describing reference relations between at least one data block in a chunk included in the storage system and at least one object stored in the storage system at the first time point;
 obtaining second metadata in a second version at a second time point of the storage system, the second time point being after the first time point;
 determining a difference between the first metadata in the first version and the second metadata in the second version;

managing the chunk included in the storage system based on the difference, wherein the managing the chunk based on the difference comprises:
  determining a data block of the at least one data block associated with the difference,
  updating a reference counter corresponding to the data block in the chunk, the reference counter describing a number of objects, of the at least one object, that reference the data block, the updating resulting in an updated reference counter, and
  managing the chunk based on the updated reference counter, wherein the managing the chunk based on the updated reference counter comprises, in response to determining, based on an allocation state of storage space in the chunk, that the storage space in the chunk has been allocated, reclaiming the chunk according to at least one reference counter corresponding to each of the at least one data block in the chunk, wherein the at least one reference counter comprises the updated reference counter.

18. The computer program product of claim 17, wherein the operations further comprise:
  recording an access request for the at least one object in response to determining the access request changes the reference relations.

19. The computer program product of claim 17, wherein the determining the difference between the first metadata in the first version and the second metadata in the second version comprises:
  determining an accessed object accessed by a recorded access request; and
  determining the difference based on the accessed object.

20. The computer program product of claim 17, wherein the reclaiming the chunk according to the at least one reference counter comprises:
  notifying the storage system to reclaim the chunk in response to the at least one reference counter indicating each of the at least one data block are no longer referenced by any object in the storage system.

* * * * *